J
US008036377B1

(12) United States Patent
Poo et al.

(10) Patent No.: US 8,036,377 B1
(45) Date of Patent: Oct. 11, 2011

(54) METHOD AND APPARATUS OF HIGH SPEED ENCRYPTION AND DECRYPTION

(75) Inventors: Tze Lei Poo, Sunnyvale, CA (US); Siu-Hung Fred Au, Fremont, CA (US); Gregory Burd, San Jose, CA (US); David Geddes, Fremont, CA (US); Heng Tang, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 964 days.

(21) Appl. No.: 11/955,088

(22) Filed: Dec. 12, 2007

Related U.S. Application Data

(60) Provisional application No. 60/869,651, filed on Dec. 12, 2006.

(51) Int. Cl.
*H04L 9/00* (2006.01)
(52) U.S. Cl. .............. 380/28; 380/29; 380/44; 708/233; 708/492
(58) Field of Classification Search .................... 380/28, 380/29, 44; 708/233, 492
See application file for complete search history.

(56) References Cited

U.S. PATENT DOCUMENTS

| | | | | | |
|---|---|---|---|---|---|
| 4,731,843 | A | * | 3/1988 | Holmquist | 380/29 |
| 5,768,390 | A | * | 6/1998 | Coppersmith et al. | 380/42 |
| 6,028,939 | A | * | 2/2000 | Yin | 380/29 |
| 7,221,763 | B2 | * | 5/2007 | Verbauwhede | 380/277 |
| 2002/0191784 | A1 | * | 12/2002 | Yup et al. | 380/37 |
| 2004/0131182 | A1 | * | 7/2004 | Rogaway | 380/37 |
| 2005/0286720 | A1 | * | 12/2005 | Fukuoka et al. | 380/255 |
| 2006/0050874 | A1 | * | 3/2006 | Matsui et al. | 380/37 |
| 2006/0098816 | A1 | * | 5/2006 | O'Neil | 380/30 |
| 2006/0126843 | A1 | * | 6/2006 | Brickell et al. | 380/260 |
| 2006/0285684 | A1 | * | 12/2006 | Rogaway | 380/37 |
| 2007/0058806 | A1 | * | 3/2007 | Ferguson | 380/42 |
| 2007/0081668 | A1 | * | 4/2007 | McGrew et al. | 380/37 |
| 2008/0270505 | A1 | * | 10/2008 | Bolotov et al. | 708/492 |

OTHER PUBLICATIONS

Shai Halevi et al, "A Parallelizable Enciphering Mode", pp. 292-304, Springer-Verlag Berlin Heidelberg, 2004.*
Shai Halevi et al, "A Tweakable Enciphering Mode", pp. 482-499, International Association for Cryptologic Research, 2003.*
Ian F. Blake et al, "Encryption of Stored Data in Networks: Analysis of a Tweaked Block Cipher", pp. 1-16, IEEE, 2004.*

(Continued)

*Primary Examiner* — Nasser Moazzami
*Assistant Examiner* — Shanto M Abedin

(57) ABSTRACT

The disclosure provides a hardware architecture for encryption and decryption device. The hardware architecture can improve the encryption and decryption data rate by using parallel processing, and pipeline operation. Further, the hardware architecture can save footprint by sharing hardware components. Additionally, the hardware architecture can be associated with a memory to protect the information stored at the memory. The encryption device can include a tweaking value manager that is configured to generate an array of tweaking values corresponding to the array of data blocks based on a tweaking encryption key, a first encryption unit that is configured to encrypt a first portion of the array of data blocks into a first portion of encrypted data blocks based on corresponding tweaking values and a data encryption key, a second encryption unit that is configured to encrypt a second portion of the array of data blocks into a second portion of encrypted data blocks based on corresponding tweaking values and the data encryption key, and a data block combiner that is configured to combine the first portion of encrypted data blocks and the second portion of encrypted data blocks into an array of encrypted data blocks.

38 Claims, 12 Drawing Sheets

OTHER PUBLICATIONS

Moses Liskov et al, "Tweakable Block Ciphers", pp. 31-46, Springer-Verlag Berlin Heidelberg, 2002.*

Morris Dworkin, "Recommendation for Block Cipher Modes of Operation Methods and Techniques", pp. 1-68, NIST Special Publication 800-38 A, 2001.*

Anna Labbe et al, "AES Implementation on FPGA: Time—Flexibility Tradeoff", pp. 836-844, Springer-Verlag Berlin Heidelberg, 2002.*

"Advanced Encryption Standard (AES)," Nov. 26, 2001, Federal Information Processing Standards Publication 197.

"AES Key Wrap Specification," Nov. 16, 2001.

"IEEE P1619™/D11 Draft Standard for Standard Architecture for Encrypted Shared Storage Media," Dec. 2006, IEEE Computer Society Committee.

* cited by examiner

| DATA BLOCK | | | | | | |
|---|---|---|---|---|---|---|
| SEQUENCE NUMBER | 0 | 1 | 2 | 3 | ... | n |
| TWEAKING INDEX | $\alpha^0$ | $\alpha^1$ | $\alpha^2$ | $\alpha^3$ | ... | $\alpha^n$ |
| TWEAKING VALUE | $T\alpha^0$ | $T\alpha^1$ | $T\alpha^2$ | $T\alpha^3$ | ... | $T\alpha^n$ |

METHOD AND APPARATUS OF HIGH SPEED ENCRYPTION AND DECRYPTION

INCORPORATION BY REFERENCE

This application claims the benefit of U.S. Provisional Application No. 60/869,651, "AES High Speed Hardware Architecture for SAS/SATA" filed on Dec. 12, 2006, including all cited references, which are incorporated herein by reference in their entirety.

BACKGROUND

Encryption and decryption algorithms, such as Advanced Encryption Standard (AES), can be used to protect sensitive or confidential information that is communicated through electrical media. Encryption algorithms can convert data into an encrypted form that can be unintelligible, and decryption algorithms can convert the encrypted data back to its original form.

The AES algorithm is a block cipher that can act on a data block of 16-byte or more using a key that can have 128-bit, 192-bit, 256-bit and the like. Further, the AES algorithm can be implemented via various modes. An AES mode can be chosen based on protection and performance requirement of a specific application.

AES Electronic Code Book (AES-ECB) is a basic mode of the AES algorithm, and is usually used as a subroutine in other modes of the AES algorithm. FIG. 8A shows a block diagram illustrating an exemplary AES-ECB encryption module 800 and FIG. 8B shows a block diagram illustrating an exemplary AES-ECB decryption module 850. The exemplary AES-ECB encryption module 800 can receive a data encryption key 830 and a data block 825. Then the exemplary AES-ECB encryption module 800 can encrypt the data block 825 into an encrypted data block 835 based on the data encryption key 830. The encrypted data block 835 can be unintelligible. The exemplary AES-ECB decryption module 850 can receive a data decryption key 880 and an encrypted data block 875 that can be unintelligible. Then the exemplary AES-ECB decryption module 850 can decrypt the encrypted data block 875 into a data block 885 based on the data decryption key 880. The data block 885 can be intelligible.

More specifically, the exemplary AES-ECB encryption module 800 can include a key expansion unit 810 and a block encryption unit 820. The key expansion unit 810 can expand the data encryption key 830 into a set of round keys 840 and provide the set of round keys 840 to the block encryption unit 820 to encrypt the data block 825. For example, a 16-byte data encryption key can be expanded into a set of ten round keys, and each round key is 16-byte.

The block encryption unit 820 can process the data block 825 through various procedures, such as shifting rows, mixing columns, or adding a round key. A round key can be added to an intermediate data block via an XOR operation. The intermediate data block can be a result of other procedures, such as mixing columns. For a 16-byte data encryption key, the procedure of adding a round key can be executed ten times, each time a different round key from the set of round keys can be added to a different intermediate data block.

The exemplary AES-ECB decryption module 850 can be constructed in a similar manner, including a key expansion unit 860 and a block decryption unit 870. The key expansion unit 860 can expand the data decryption key 880 into a set of round keys 890 and provide the set of round keys 890 to the block decryption unit 870 to decrypt the data block 875.

SUMMARY

The disclosure provides a hardware architecture for encryption and decryption device. The hardware architecture can improve the encryption and decryption data rate by using parallel processing, and pipeline operation. Further, the hardware architecture can save footprint by sharing hardware components.

Aspects of the disclosure can be direct to an encryption device that encrypts an array of data blocks. The encryption device can include a tweaking value manager that is configured to generate an array of tweaking values corresponding to the array of data blocks based on a tweaking encryption key, a first encryption unit that is configured to encrypt a first portion of the array of data blocks into a first portion of encrypted data blocks based on corresponding tweaking values and a data encryption key, a second encryption unit that is configured to encrypt a second portion of the array of data blocks into a second portion of encrypted data blocks based on corresponding tweaking values and the data encryption key, and a data block combiner that is configured to combine the first portion of encrypted data blocks and the second portion of encrypted data blocks into an array of encrypted data blocks. The first and second encryption units can be configured to work in parallel to speed up encryption operation for the array of data blocks.

Further, the first and the second encryption units both can include a first tweaking unit that is configured to calculate a tweaked data block based on a data block and the corresponding tweaking value, an Advanced Encryption Standard Electronic Code Book mode (AES-ECB) engine that is configured to encrypt the tweaked data block into an encrypted tweaked data block based on the data encryption key, and a second tweaking unit that is configured to calculate an encrypted data block based on the encrypted tweaked data block and the corresponding tweaking value.

Furthermore, buffers can be added in the encryption device to enable pipeline operation. For example, the first and second encryption unit can further include a first buffer that is configured to receive the data block to be encrypted, buffer the data block for a first pipeline stage and provide the data block to the first tweaking unit, and a second buffer that is configured to receive the encrypted tweaked data block from the AES-ECB engine, buffer the said encrypted tweaked data block for a second pipeline stage and provide the encrypted tweaked data block to the second tweaking unit.

Additionally, the two AES-ECB engines of the first and second encryption units can be configured to share a key expansion unit that is configured to expand the data encryption key into a set of round keys. A round key memory can be included in the encryption device, and can be configured to store the set of round keys. The key expansion unit can be synchronized with the first and the second encryption units so as to repeatedly expand the data encryption key into the set of round keys and provide the set of round keys to the first and the second encryption units for encrypting each data block. Alternatively, the two AES-ECB engines can be configured to have independent key expansion units and independent round key memory. Such a configuration would permit asynchronous operation of the AES-ECB engines.

The tweaking value manager can be implemented by including an AES-ECB engine that is configured to encrypt an initial tweaking value with the tweaking encryption key to generate an encrypted initial tweaking value, and a tweaking value generator that is configured to calculate the array of tweaking values based on the encrypted initial tweaking value. To further save footprint, the tweaking value manager can share the AES-ECB engine of one of the first and second encryption units.

According to aspects of the disclosure, the encryption device can be used to protect data stored in a sector based memory. The initial tweaking value can be based on a location in the memory that is assigned to store the array of data blocks, such as logical block address (LBA) of the location.

According to an embodiment, the first portion of the data blocks can have even sequences, and the second portion of the data blocks can have odd sequences.

The disclosed encryption device can also handle encryption for an array that a last data block is shorter than the rest of the data blocks, known as partial codeword handling. The encryption device can include a feedback that connects an output of one of the first and second encryption units to an input of one of the first and second encryption units, the feedback being configured to be activated when the data block at the input is a partial codeword.

Aspects of the disclosure can also provide a decryption device that decrypts an array of encrypted data blocks. The decryption device can include a first decryption unit that is configured to decrypt a first portion of the array of encrypted data blocks into a first portion of decrypted data blocks based on corresponding tweaking values and a data decryption key, a second decryption unit that is configured to decrypt a second portion of the array of encrypted data blocks into a second portion of decrypted data blocks based on corresponding tweaking values and the data decryption key, and a data block combiner that is configured to combine the first portion of decrypted data blocks and the second portion of decrypted data blocks into an array of decrypted data blocks. Similar features of the encryption device can be applied to the decryption device.

The disclosure can also provide an encryption/decryption method that encrypts/decrypts an array of data blocks. The encryption/decryption method can include generating an array of tweaking values corresponding to the array of data blocks based on a tweaking encryption key, encrypting/decrypting a first portion of the array of data blocks into a first portion of encrypted/decrypted data blocks based on corresponding tweaking values and a data encryption/decryption key, encrypting/decrypting a second portion of the array of data blocks into a second portion of encrypted/decrypted data blocks based on corresponding tweaking values and the data encryption/decryption key, and combining the first portion of encrypted/decrypted data blocks and the second portion of encrypted/decrypted data blocks into an array of encrypted/decrypted data blocks.

Aspects of the disclosure can be applied to a storage device that stores an array of data blocks. The storage device can include a storage medium, a tweaking value manager that is configured to generate an array of tweaking values corresponding to the array of data blocks based on a tweaking encryption key and an address of the storage medium, a first encryption unit that is configured to encrypt a first portion of the array of data blocks into a first portion of encrypted data blocks based on corresponding tweaking values and a data encryption key, a second encryption unit that is configured to encrypt a second portion of the array of data blocks into a second portion of encrypted data blocks based on corresponding tweaking values and the data encryption key, a data block combiner that is configured to combine the first portion of encrypted data blocks and the second portion of encrypted data blocks into an array of encrypted data blocks, and a memory controller that is configured to write the array of encrypted data blocks to the address of the storage medium.

Additionally, the storage device can include a decryption device that is configured to decrypt the array of encrypted data blocks into the array of data block based on the tweaking encryption key, the address of the storage medium and a data decryption key.

BRIEF DESCRIPTION OF THE DRAWINGS

Various exemplary embodiments of this disclosure will be described in detail with reference to the following figures, wherein like numerals reference like elements and wherein:

FIG. 11 shows diagram of an exemplary array of data blocks; and

DETAILED DESCRIPTION OF EMBODIMENTS

Advanced Encryption Standard (AES) algorithm can be implemented via various modes to encrypt data-in-fly or data-at-rest. For example, Advanced Encryption Standard Tweakable Block Cipher mode (AES-XTS) is a mode of AES algorithm that can be used to encrypt data-at-rest, such as data stored in a sector based memory media.

Figure 1:
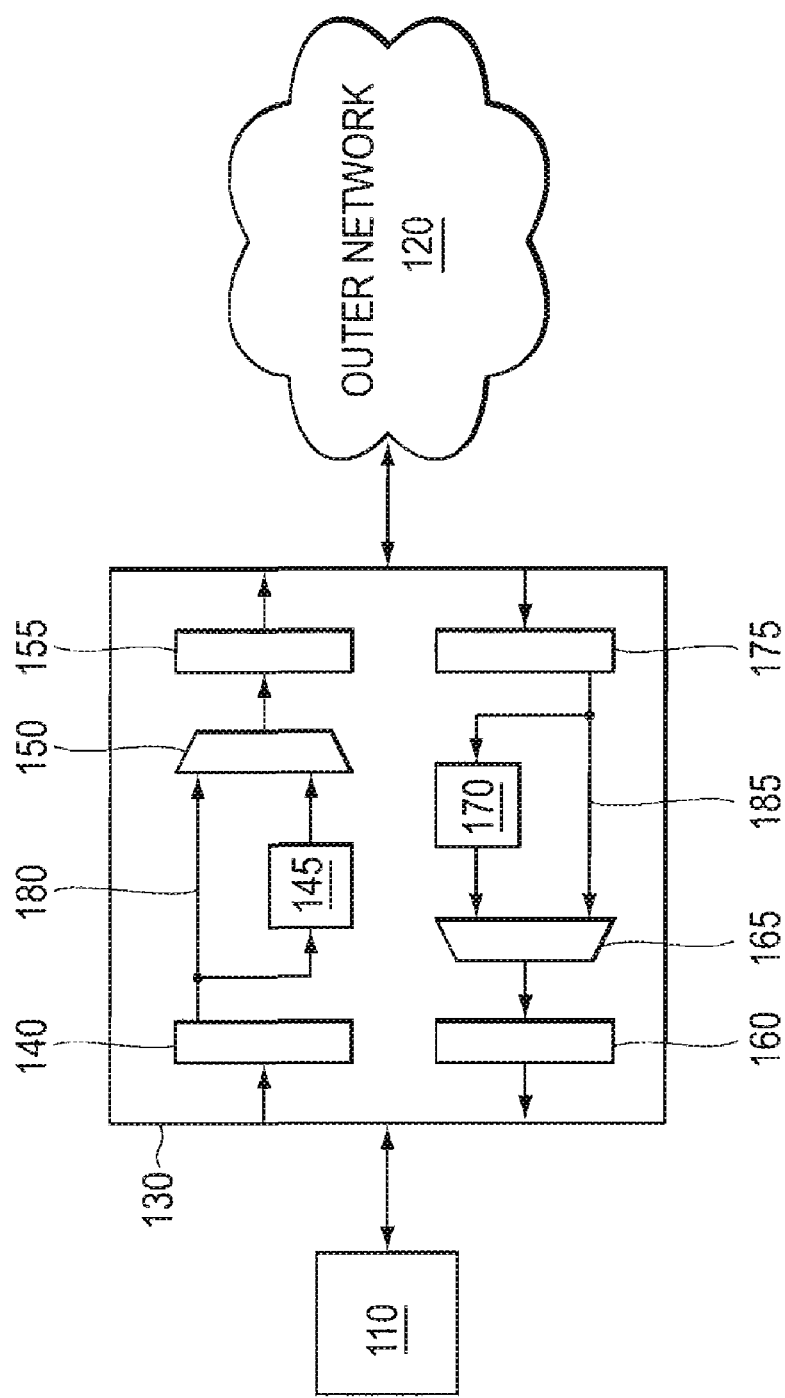
FIG. 1 shows an exemplary scenario of Advanced Encryption Standard Tweakable Block Cipher mode (AES-XTS) application.

FIG. 1 shows a diagram illustrating an exemplary scenario of AES-XTS application for data protection. As shown, a sector based memory media 110 can be protected by AES-XTS against attacks from an outer network 120. The sector based memory media can be included in a system, such as a host system, for data storage. More specifically, the sector based memory media may include a memory media and supporting mechanisms, such as data bus, direct memory access (DMA) mechanism. The sector based memory media 110 can store data of a fixed length, such as 512 bytes, 520 bytes, 528 bytes, 1024 bytes, 1028 bytes, 1032 bytes, 1036 bytes, 2048 bytes, 2052 bytes, 2056 bytes, 2060 bytes, 4096 bytes, 4100 bytes, 4104 bytes, 4108 bytes, and the like. The outer network 120 can include anything that can access the sector based memory media 110, such as a CPU, a storage network containing sector based memory media, or non sector based memory media, and the like. The CPU may be controlled by a malicious agent that tries to perform attacks, such as a copy-and-paste attack that can copy data stored at the sector based memory media 110 and paste the data to another memory media. The data stored in the sector based memory media 110 may contain confidential information. Leaking confidential information may direct to severe damage to an owner of the data. Therefore, an encryption technique may be preferred to protect the data stored at the sector based memory media 110.

Usually, a Serial Attached SCSI and/or Serial Advanced Technology Attachment (SAS/SATA) interface device 130 can be used to transmit data between the sector based memory media 110 and the outer network 120. The SAS/SATA interface device 130 can transmit data in two directions. One direction is from the outer network 120 to the memory media 110, and the other direction is from the memory media 110 to the outer network 120, as indicated by arrows in FIG. 1.

The SAS/SATA interface device 130 can include various components that facilitate and protect data transmission. For example, component 160 can include a decoder that can detect and correct errors that may happen during data transmission from the outer network 120 to the memory media 110. Component 170 can include an encryption module, such as an AES-XTS encryption module, that encrypts data transmitted from the outer network 120, and then the encrypted data can be stored in the memory media 110. Component 145 can include a decryption module, such as an AES-XTS decryption module, that decrypts the encrypted data that is requested by the outer network 120. As can be seen from FIG. 1, the encryption and decryption are optional. Data paths 180 and 185 can bypass the encryption module and the decryption module. Choice of AES-XTS protection can be indicated by interface commands. For example, a copy-and-paste type command can transmit the data stored in the sector based memory media 110 to the outer network without decryption.

Throughput can be a concern for encryption and decryption algorithms. For example, the SAS/SATA interface device 130 can achieve a data transmission rate of 600 Mbytes per second when data protection modules are bypassed. In order to maintain substantially the same transmission data rate for data with or without protection, the encryption and decryption modules can be required to achieve a data rate of 600 Mbytes per second. Using AES-XTS as an example, generally, AES-XTS can use an AES Electronic Code Book mode (AES-ECB) engine. When using single AES-ECB engine, the required data encryption or decryption rate can be difficult to achieve. For example, using a single AES-ECB encryption or decryption engine with a 128-bit key, a 16-byte data block can be encrypted or decrypted in 10 clock cycles. When the clock frequency is 300 MHz, which is normal for a SAS/SATA interface device, a maximum data encryption rate of 480 Mbytes per second can be achieved, which can be more than 10% lower than the required data rate.

One technique to increase an encryption or decryption data rate can be parallel encryption or decryption. This technique requires the algorithm being able to be executed in parallel. For example, AES-XTS is one of the various modes of the AES algorithm that can be executed in parallel.

AES-XTS can act on a data sector. The data sector can be considered as an array of data blocks. For example, if a block is 16-byte, a 512-byte sector can be considered as an array of 32 elements, each element is a 16-byte data block. Additionally, a last data block can be shorter than the rest of the blocks if the sector length is not a multiple of 16 bytes. For example, a 520-byte sector can be considered as an array of 33 array elements, each of the first 32 elements can be a 16-byte data block, the last array element can be an 8-byte data block, which is shorter than the rest of the data blocks. Generally, the shorter data block can be referred as a partial codeword. Each array element can have a sequence number n that corresponds to its position in the array of blocks, and is counted from zero in this disclosure. For example, data blocks in a 32-element array can be counted as 0, 1, 2, 3, . . . , and 31. The first block has a sequence number 0, while the last block has a sequence number 31.

Figure 9:
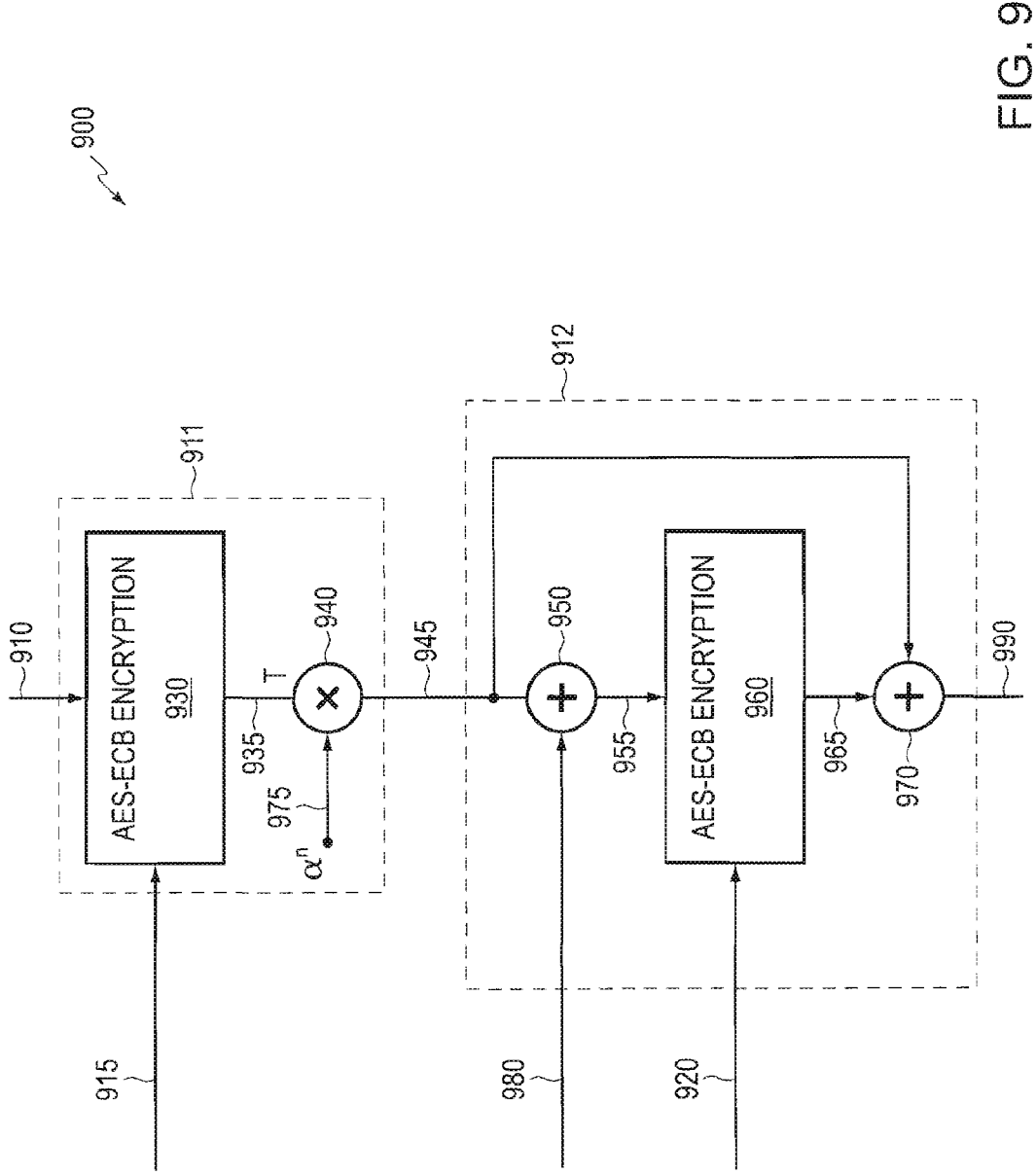
FIG. 9 shows diagram of an exemplary AES-XTS encryption module.

AES-XTS can act on each data block respectively. FIG. 9 shows a block diagram illustrating an exemplary AES-XTS encryption module 900. The exemplary AES-XTS encryption module 900 can receive an initial tweaking value 910, a tweaking encryption key 915, and a data encryption key 920. Additionally, the exemplary AES-XTS encryption module can receive a data block 980 from an array of data blocks, and encrypt the data block 980 into an encrypted data block 990. After each data block from the array of data blocks is encrypted, the encrypted data blocks can form an array of encrypted data blocks.

AES-XTS encryption module 900 can include a tweaking key unit 911 and a data encryption unit 912. The tweaking key unit 911 can receive the initial tweaking value 910 and the tweaking encryption key 915 to generate a tweaking value 945 and provide the tweaking value 945 to the data encryption unit 912. For different data block 980, the tweaking value 945 can be different. The tweaking value 945 corresponding to the data block 980 can be generated based on the sequence number n of the data block 980.

Subsequently, the data encryption unit 912 can encrypt the data block 980 into an encrypted data block 990. The encryption can be based on the corresponding tweaking value 945 and the data encryption key 920. Generally, the data encrypt on key 920 can be common for data blocks in the array of data blocks. The tweaking key unit 911 and the data encryption unit 912 are discussed in greater detail below.

The tweaking key unit 911 can include an AES-ECB encryption module 930 and a multiplier module 940. The AES-ECB encryption module 930 can encrypt the initial tweaking value 910 with the tweaking encryption key 915 to generate an encrypted initial tweaking value (T) 935. Subsequently, according to the sequence number n of the data block 980, the tweaking key unit 911 can generate a tweaking index 975. For example, the tweaking index 975 can be $\alpha^n$, where $\alpha$ is a constant number. Often, the constant number $\alpha$ can be a primitive element in a Galois Field. For example, if the Galois Field is GF($2^8$), then $\alpha$ can be chosen to be 2. Therefore, when the data block 980 is of a sequence number 0, the tweaking index is 1, when the data block 980 is of a sequence number 1, the tweaking index is 2, when the data block 980 is of a sequence number 2, the tweaking index is 4 . . . , and so on and so forth. The multiplier 940 can generate the tweaking value 945 by multiplying the tweaking index 975 with the encrypted initial tweaking value 935. In consequence, a data block 980 of an array of data blocks can have a corresponding tweaking value 945 that is based on the sequence number n of the data block 980.

FIG. 11 shows an exemplary array of data blocks. Also shown in FIG. 11 are corresponding sequence numbers, tweaking indexes and tweaking values for each data block of the array. For a data block having a sequence number n, the tweaking index can be $\alpha^n$ and the corresponding tweaking value can be $T\alpha^n$, where T is the encrypted initial tweaking value.

As shown in FIG. 9, the data encryption module 912 can include a first adder 950, a second adder 970, and an AES-ECB encryption module 960. The first adder 950 can add the data block 980 with the corresponding tweaking value 945 by XOR operation. Then the first adder 950 can output a tweaked data block 955, and provide the tweaked data block 955 to the AES-ECB encryption module 960. Subsequently, the AES- ECB encryption module 960 can encrypt the tweaked data block 955 with the data encryption key 920 to generate an encrypted tweaked data block 965. Further, the second adder 970 can add the tweaked data block 965 with the corresponding tweaking value 945 by XOR operation. Then the second adder 970 can output the encrypted data block 990.

Figure 10:
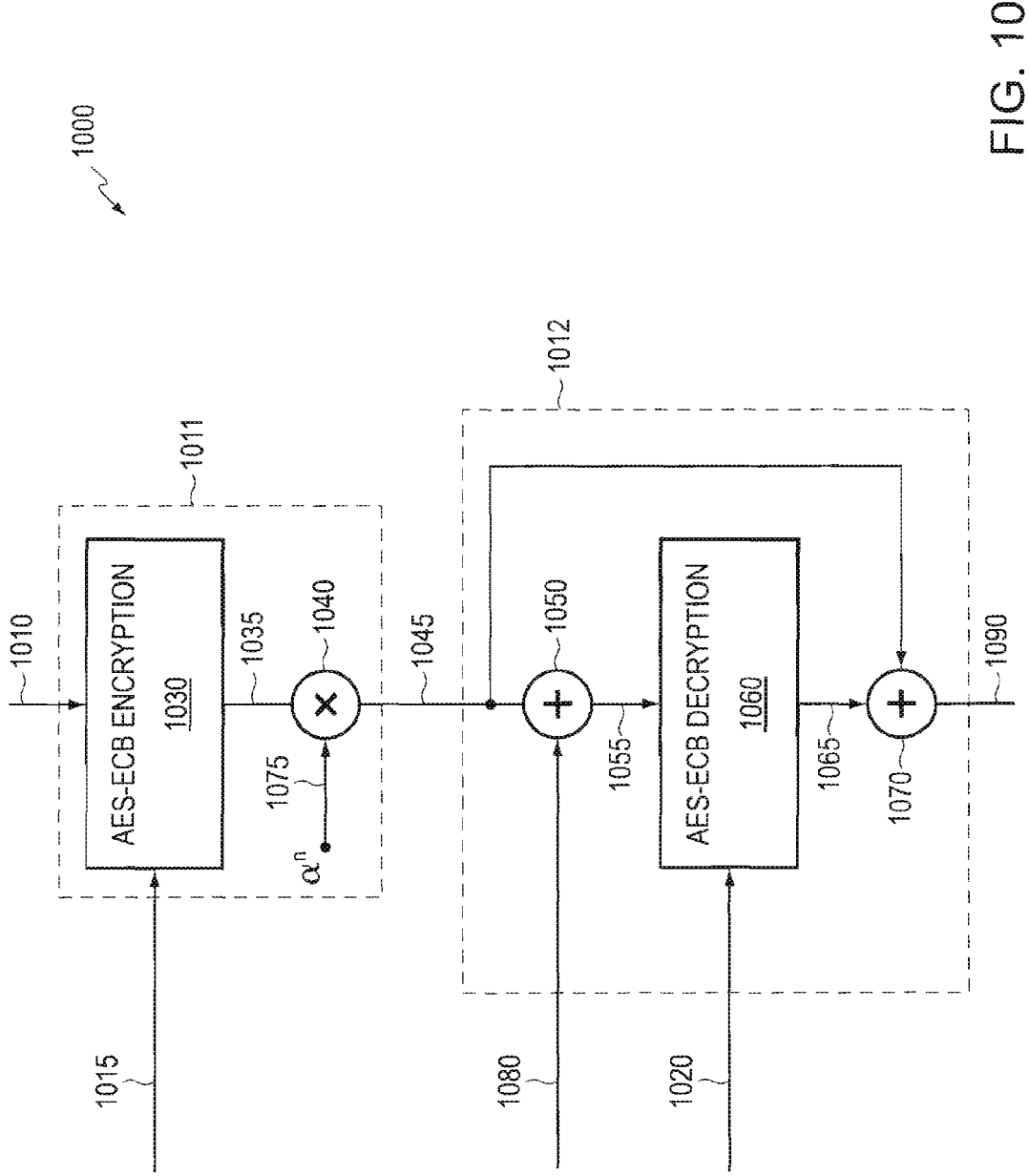
FIG. 10 shows diagram of an exemplary AES-XTS decryption module.

FIG. 10 shows a block diagram illustrating an exemplary AES-XTS decryption module 1000. The exemplary AES-XTS decryption module 1000 can receive an initial tweaking value 1010, a tweaking encryption key 1015, and a data decryption key 1020. Additionally, the exemplary AES-XTS decryption module 1000 can receive an encrypted data block 1080, which may be unintelligible, from an array of encrypted data block. Subsequently, the exemplary AES-XTS decryption module 1000 can decrypt the encrypted data block 1080 into a data block 1090. After each encrypted data block from the array of encrypted data blocks are decrypted, the decrypted data blocks can form an array of data blocks.

AES-XTS decryption module 1000 can include a tweaking key unit 1011 and a data decryption unit 1012. The tweaking key unit 1011 can be constructed in a same manner as the tweaking key unit 911 in FIG. 9, and can operate in a same manner as the tweaking key unit 911. The data decryption unit 1012 can be constructed in a same manner as the data encryption unit 912, except using an AES-ECB decryption module 1060 instead of an AES-ECB encryption module 960, and can operate in a same manner as the data encryption unit 912, except using AES-ECB decryption operation instead of AES-ECB encryption operation.

Generally, if an array of data blocks is encrypted based on an initial tweaking value, a tweaking encryption key, and a data encryption key, the same initial tweaking value, tweaking encryption key and data encryption key can be required to decrypt the encrypted array of data blocks. Without knowing one of them, such as the initial tweaking value, the encrypted array of data blocks may not be decrypted. In one embodiment, the initial tweaking value 910 can be related to a memory location. For example, the initial tweaking value 910 can be a logical address, such as a logical block address (LBA), that is assigned to the memory location to store the array of data blocks. Such configuration can prevent threats, such as copy-and-paste attack.

As can be seen from FIG. 9, operations of the data encryption unit 912 can be independent for each data block in the array as long as the corresponding tweaking value 945 can be provided. In other words, more than one data encryption units can operate in parallel to speed up the encryption for the array of data blocks. On the other hand, increasing data encryption units can increase footprint. Aspects of the disclosure can provide a high throughput hardware architecture, with consideration of saving footprint.

Figure 2:
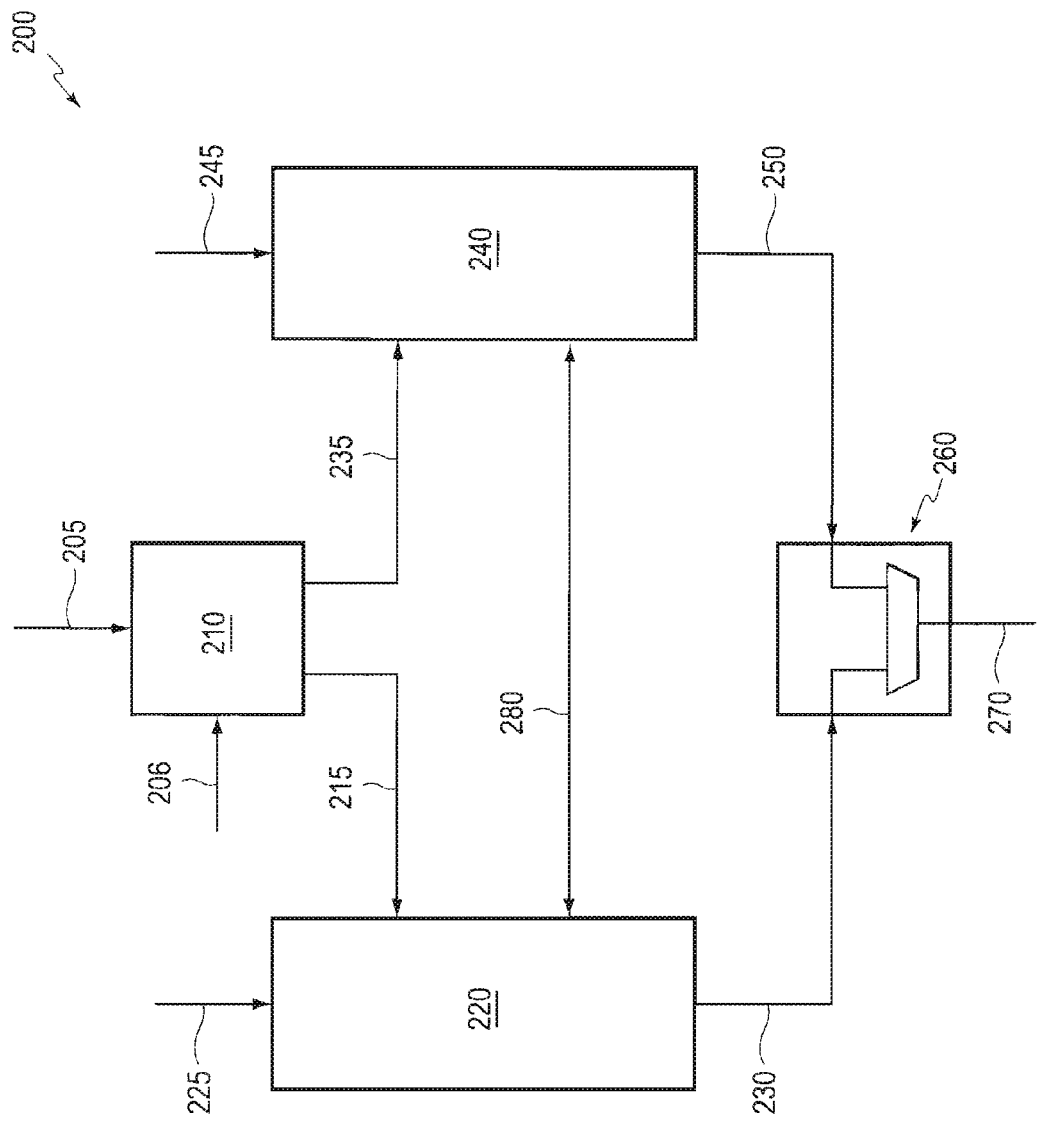
FIG. 2 shows a block diagram of an exemplary AES-XTS encryption module using two data encryption units.

FIG. 2 shows a block diagram of an exemplary AES-XTS module that uses two data encryption units for high throughput processing. The AES-XTS module can include a tweaking value manager 210, and two data encryption units 220 and 240. Each of the data encryption units can encrypt a portion of an array of data blocks. For example, the data encryption unit 220 can encrypt a portion of data blocks with an even sequence number, and the data encryption unit 240 can encrypt a portion of data blocks with an odd sequence number.

The tweaking value manager 210 can be configured to receive an initial tweaking value 205, and a tweaking encryption key 206. Then the tweaking value manager 210 can calculate tweaking values, and provide them to the tweaking encryption unit 220 and 240 via data path 215 and 235 respectively. The data encryption unit 220 can receive a data block 225, and encrypt the data block 225 with the corresponding tweaking value 215 and a common data encryption key 280. The data encryption unit 220 can work in parallel with the data encryption unit 240, which can receive a data block 245, and encrypt the data block 245 with the corresponding tweaking value 235 and the common data encryption key 280.

Further, the exemplary AES-XTS module can include a data block combiner 260 that can combine encrypted data blocks from data encryption units 220 and 240 into an array of encrypted data blocks. Additionally, the AES-XTS module can include a controller (not shown) that can be coupled to the other parts of the AES-XTS module, and provide control signals to coordinate operations of various parts of the AES-XTS module.

While two data encryption units are shown in the exemplary AES-XTS hardware architecture, it should be understood that more than two data encryption units can be used to further increase data rate. In an embodiment, the data encryption units can be independent of each other, and can work asynchronously.

Figure 3:
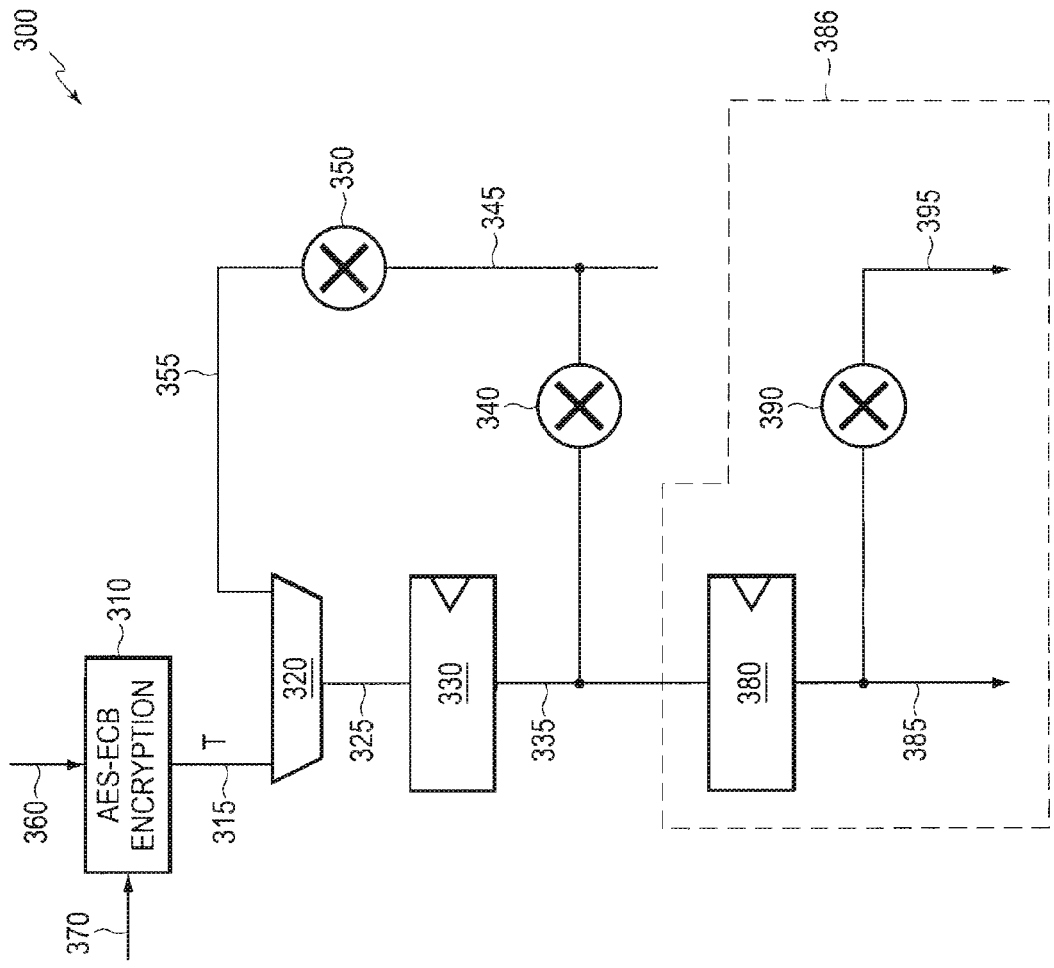
FIG. 3 shows a block diagram of an exemplary tweaking value manager.

FIG. 3 shows a more detail block diagram of an exemplary tweaking value manager 300. The exemplary tweaking value manager 300 can include an AES-ECB encryption engine 310, a MUX 320, a buffer 330, and two multipliers 340 and 350. Those components can be coupled as shown in FIG. 3. Not shown in FIG. 3, a controller can be included that can be coupled to those components and coordinate their operations.

The AES-ECB encryption engine 310 can receive an initial tweaking value 360 and a tweaking encryption key 370. Then the AES-ECB encryption engine 310 can encrypt the initial tweaking value 360 with the tweaking encryption key 370 to generate an encrypted initial tweaking value (T) 315, and provide the encryption initial tweaking value (T) 315 as a first input to the MUX 320. The MUX 320 can be configured to choose either the first input, which is the encrypted initial tweaking value (T) 315, or a second input, which is from data path 355, outputted from the multiplier 350. The MUX 320 can transmit what has been chosen to the buffer 330. The buffer 330 can be controlled to buffer the transmitted data from the MUX 320, and drive the data on data path 335.

The two multipliers 340 and 350 can be configured to be constant Galois Field multipliers, and each of them can multiply an input with a chosen constant number $\alpha$ and output a result. For example, the multiplier 340 can receive the input on data path 335, and multiply the constant number $\alpha$, then output to data path 345. The multiplier 350 can receive the input on data path 345, and multiply the constant number $\alpha$, then output to data path 355, which leads to the second input of the MUX 320. In one embodiment, the multipliers 340 and 350 can be simplified to bit-wise shifter and adder, for example, when the constant number is chosen to be 2.

Initially, the MUX 320 can choose the first input, which is the encrypted initial tweaking value T, and transmit to the buffer 330. The buffer 330 can be controlled to receive the encrypted initial tweaking value T, buffer and drive the value on data path 335. Therefore, data path 335 can be T, and data path 345 can be T$\alpha$ after a multiplication operation by the multiplier 340. As a result, data path 355, which is the second input to the MUX 320, can be T$\alpha^2$ after a multiplication operation by the multiplier 350.

Subsequently, the MUX 320 can be configured to choose the second input, which is the output of the multiplier 350 and send to the buffer 330. The buffer 330 can be controlled to receive the output of the multiplier 350, which is T$\alpha^2$, and then buffer and drive the value on data path 335. Therefore, data path 335 can be T$\alpha^2$, and data path 345 can be T$\alpha^3$ after a multiplication operation by the multiplier 340. As a result, data path 355, which is the second input to the MUX 320, can be $T\alpha^4$ after a multiplication operation by the multiplier 350.

Subsequently, the MUX 320 can continually choose the second input, which is equal to $T\alpha^4$. The buffer 330, the multiplier 340 and 350, and the MUX 320 can work in the same manner, so on so forth.

As can be seen from the above description, the exemplary tweaking value manager 300 can provide two outputs, a first output on data path 335, and a second output on data path 345. The first output 335 can be represented as $T\alpha^{2j}$, the second output 345 can be represented as $T\alpha^{2j+1}$, where j is an integer and is counted from zero. In other words, the exemplary tweaking value manager 300 can provide two tweaking values at a time, the first tweaking value corresponds to a data block of an even sequence number, and the second tweaking value corresponds to a data block of an odd sequence number.

It should be understood that while the exemplary tweaking value manager 300 can provide two tweaking values to two data encryption units, more multipliers can be added to increase the number of outputs, which can provide tweaking values to more data encryption units.

Additionally, block 386 including a buffer 380 and a multiplier 390 coupled as shown can be added and connected to the exemplary tweaking value manager 300 via data path 335. In one embodiment, the buffer 380 can be configured to be synchronized with the buffer 330. Therefore, while the buffer 330 is controlled to receive and buffer a new data from data path 325, and drive the new data on data path 335, the buffer 380 can receive and buffer the previous data. Therefore, while the data path 335 and 345 can be represented by $T\alpha^{2j}$, and $T\alpha^{2j+1}$ respectively, data path 385 and 395 can be represented by $T\alpha^{2j-2}$ and $T\alpha^{2j-1}$ respectively. Later, this feature combining with features of data encryption units can be used to facilitate pipeline design, which can further improve date rate.

Figure 4:
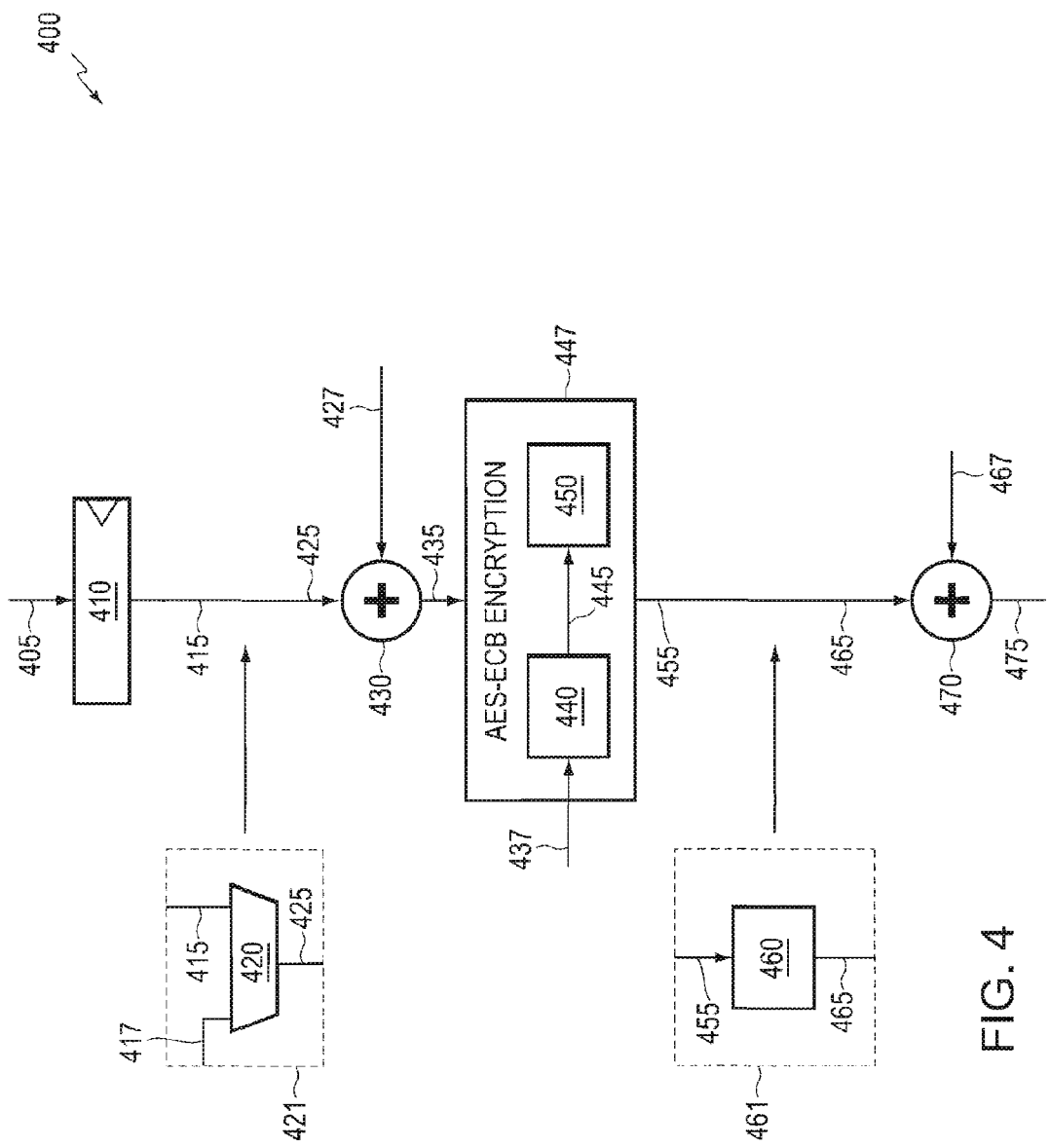
FIG. 4 shows a block diagram of an exemplary data encryption unit.

FIG. 4 shows a more detailed block diagram of an exemplary data encryption unit 400. The exemplary data encryption unit 400 can include a first buffer 410, a first adder 430, an AES-ECB encryption engine 447, and a second adder 470. The exemplary data encryption unit 400 can receive a data block 405, a first tweaking value 427, a second tweaking value 467 and a data encryption key 437. The exemplary data encryption unit 400 can encrypted data block 405 based on the first tweaking value 427, second tweaking value 467 and the data encryption key 437. In one embodiment, the first tweaking value 427 can be equal to the second tweaking value 467.

The first buffer 410 can receive the data block 405, and transmit the data block 405 to a first input of the first adder 430. The first adder 430 can add the first input, which is equal to the data block 405, and a second input, which is the first tweaking value 427, to calculate a tweaked data block 435. The first adder 430 can be implemented by XOR circuit.

The AES-ECB encryption engine 447 can receive the tweaked data block 435, encrypt the tweaked data block 435 into an encrypted tweaked data block 455, and send to the second adder 470 as a first input. The second adder 470 can add the first input with a second input, which can be the second tweaking key 467 to calculate encrypted data block 475. The second adder 470 can be implemented by XOR circuit. In this case, the second tweaking value 467 can be the same as the first tweaking value 427.

In an embodiment, the exemplary data encryption unit 400 can include a second buffer 460, which can be inserted as indicated by block 461 in FIG. 4. The second buffer 460 can be configured to be synchronized with the first buffer 410. Therefore, when the first buffer 410 receives a new data block, the second buffer can receive the encrypted tweaked data block of the previous data block. In such a case, the first tweaking value 427 and the second tweaking value 467 are different. For example, the first tweaking value 427 can be connected to data path 335 in FIG. 3, and the second tweaking value 467 can be connected to data path 385 in FIG. 3. By such configuration, while the first adder 430 can act on the new data block with a corresponding tweaking value, the second adder 470 can act on the previous data block with its corresponding tweaking value. This configuration can be referred as pipeline, and can improve data rate. While the buffer 460 is shown as an extra buffer in FIG. 4, it should be understood that buffer 460 can be a buffer of the AES-ECB encryption engine 447 that can be configured to include the above feature.

In another embodiment, a MUX 420 can be inserted in the exemplary data encryption unit as indicated by block 421 in FIG. 4. This embodiment can be used to handle cases that a last data block has a shorter length, known as partial codeword handling. As mentioned, AES-ECB can act on a block data of fixed length, such as 16-byte. When the last data block is a partial codeword, a portion of encrypted previous data block can be added to the last data block to add up the length of the last data block to the fixed length. The MUX 420 can work in a following exemplary manner. Before handling the partial codeword, the MUX 420 can be configured to choose data path 415; when handling the partial codeword, the MUX 420 can be configured to choose a portion of data path 417, which can be a feedback of encrypted previous data block, to substitute portion of data path 415 that can be empty.

In another embodiment, multiple data encryption units can share hardware of a key expansion unit 440. As mention above, an AES-ECB engine 447 can include a key expansion unit 440, and a block encryption unit 450. According to AES-XTS, a common data encryption key is used to encrypt an array of data blocks. The common data encryption key can be expanded into a common set of round keys. Therefore, multiple AES-ECB engines can share the set of round keys that generated by the key expansion unit 440.

In one embodiment, the set of round keys can be generated once for an array of data block, and save in a memory unit (not shown). The memory unit can be configured to provide the set of round keys to the multiple data encryption units.

In another embodiment, the key expansion unit 440 can be configured to be synchronized with multiple block encryption units 450, and repeatedly expand the data encryption key into the set of round keys and provide the set of round keys to the multiple block encryption units.

In another embodiment, each AES-ECB engine can have an independent key expansion unit, such that each AES-ECB engine can work independently. Therefore, the multiple AES-ECB engines can be configured to work asynchronously.

Figure 5:
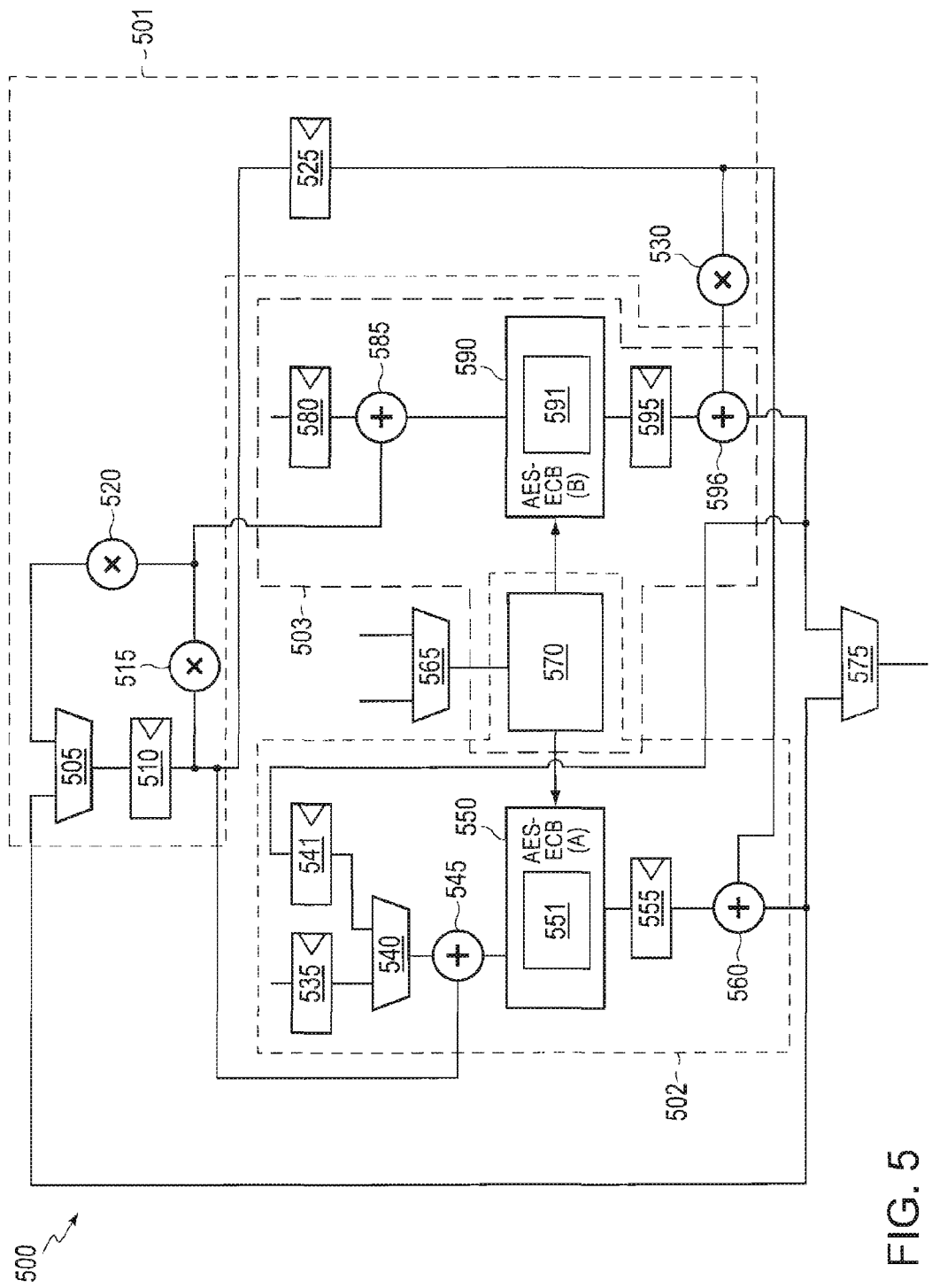
FIG. 5 shows a hardware architecture of an exemplary AES-XTS encryption module.

FIG. 5 shows a more detailed hardware architecture of an exemplary AES-XTS encryption module 500. The exemplary AES-XTS encryption module 500 can include an exemplary tweaking value manager and two exemplary data encryption units. Further, the exemplary AES-XTS encryption module 500 can include a controller (not shown), which can provide control signals to the exemplary tweaking value manager and the two exemplary data encryption units to coordinate their operations.

The exemplary tweaking value manager is constructed in a similar manner as FIG. 3 with the optional block 386. Components of the exemplary tweaking value manager are enclosed in block 501 except an AES-ECB engine. The AES-ECB engine can be shared with one of the data encryption units. As can be seen, the exemplary tweaking value manager

501 can include a MUX 505, a first buffer 510, a first multiplier 515, and a second multiplier 520 to provide tweaking values to the exemplary data encryption units. Additionally, the exemplary tweaking value manager 501 can include a second buffer 525 and a third multiplier 530 in a manner as the optional block 386 in FIG. 3, thus the exemplary tweaking value manager 501 can provide tweaking values for pipeline operations of the exemplary data encryption units.

The exemplary data encryption units are constructed in a similar manner as in FIG. 4. A first exemplary data encryption unit is enclosed in block 502, a second exemplary data encryption unit is enclosed in block 503. As can be seen, the first exemplary data encryption unit 502 can be configured to include a first buffer 535, a MUX 540, a first adder 545, an AES-ECB engine 550 with a possibly shared key expansion unit 570, a second buffer 555, and a second adder 560. The MUX 540 can enable the first exemplary data encryption unit 502 to process a last data block of an array when the last data block is a partial codeword. The second buffer 555 with corresponding feature of the tweaking value manager 501 can enable pipeline operation of the first exemplary data encryption unit 502, which can improve the data rate. Further, the data encryption key expansion unit 570 can provide saving in footprint if shared.

As can be seen, the second exemplary data encryption unit 503 can be configured to include a first buffer 580, a first adder 585, an AES-ECB engine 590 with the shared key expansion unit 570, a second buffer 595, and a second adder 596. The second buffer 595 with corresponding feature of the tweaking value manager 501 can enable pipeline operation of the second exemplary data encryption unit 503, which can improve the data rate.

Additionally, the exemplary AES-XTS encryption module 500 can include a MUX 565. The MUX 565 can choose a first input, which can be the data encryption key, or a second input, which can be the tweaking encryption key to the AES-ECB engine 550. This is due to the reason that the exemplary tweaking value manager 501 is configured to share the AES-ECB engine 550 with the first exemplary data encryption module 502.

Furthermore, the exemplary AES-XTS encryption module can include a MUX 575, which can combine the encrypted data blocks from the exemplary data encryption units to form an array of encrypted data blocks.

Figure 7:
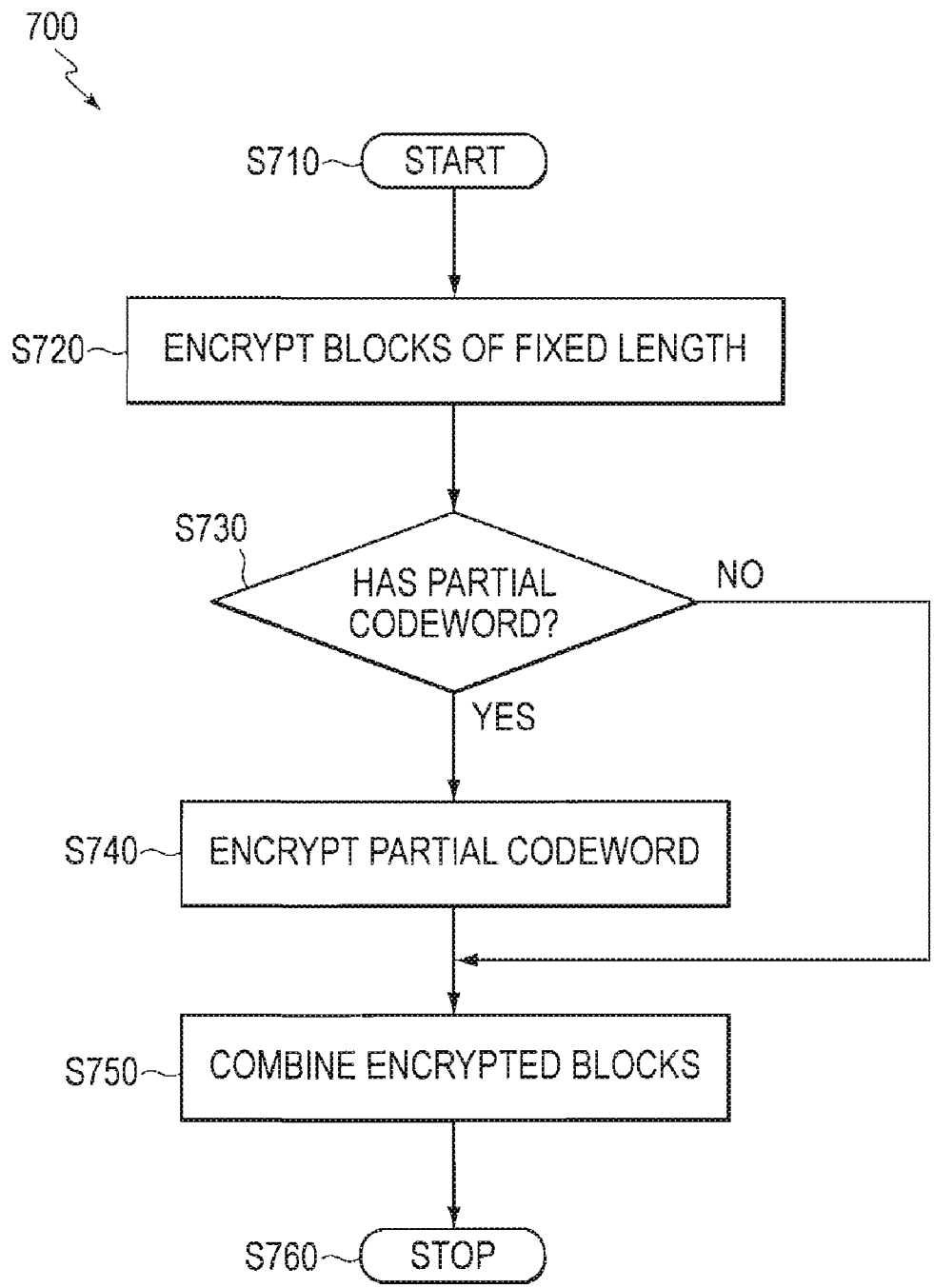
FIG. 7 shows a flow chart outlining an exemplary AES-XTS encryption procedure.
Figures 8A, 8B:
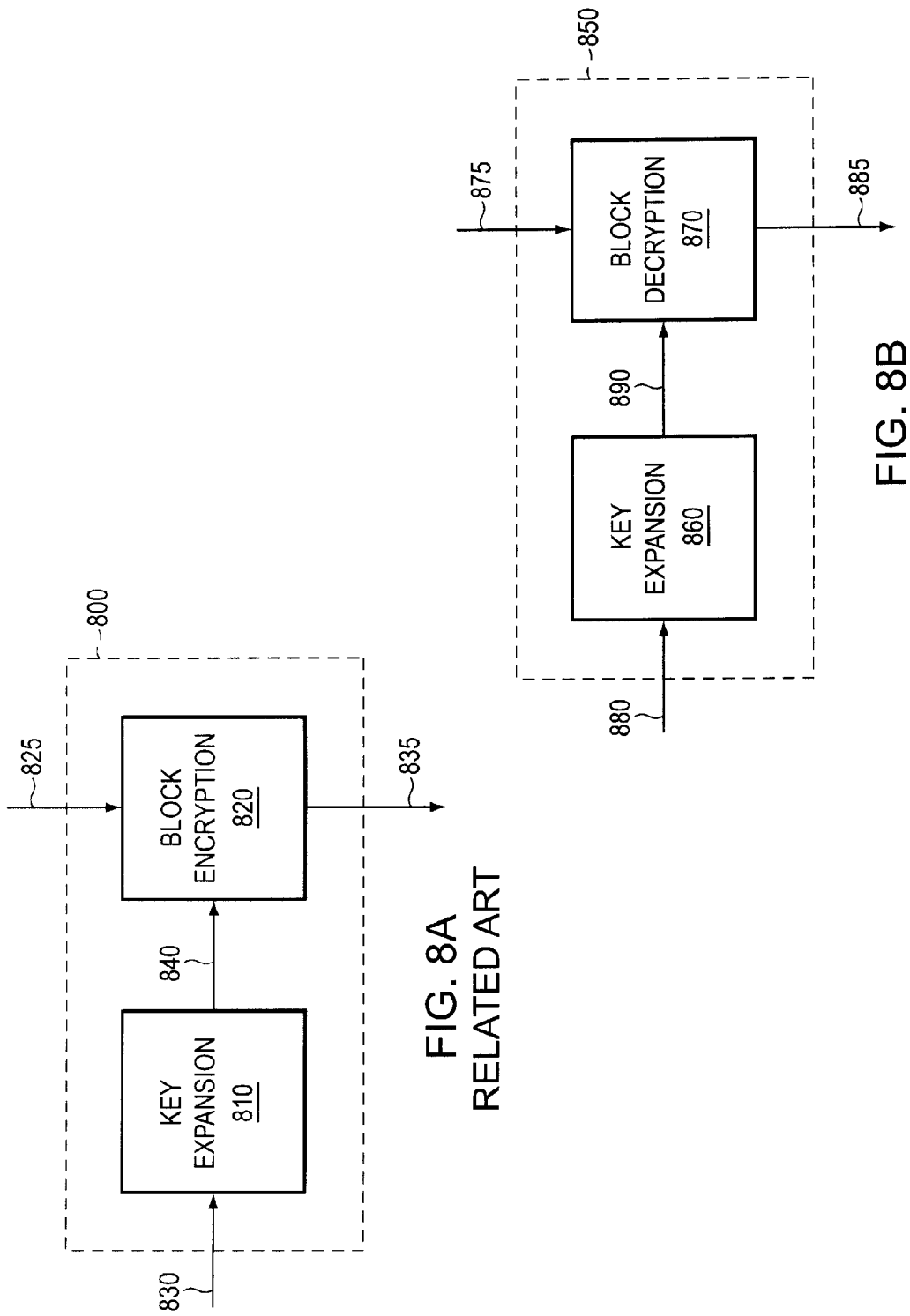
FIGS. 8A and 8B show block diagrams of exemplary AES-ECB encryption and decryption module.

FIG. 7 shows a flowchart outlining an exemplary operation process of the exemplary AES-XTS encryption module 500 to encrypt an array of data blocks.

The process starts at step S710, and proceeds to step S720, where the exemplary AES-XTS encryption module can encrypt data blocks of a fixed length, such as 16-byte. For example, when the array of data blocks includes 520 bytes, the exemplary AES-XTS encryption module can encrypt the first 32 data blocks that each has 16-byte. The exemplary AES-XTS encryption module 500 can include two data encryption units, therefore, two data blocks, such as a data block of an even sequence number and a data block of an odd sequence number, can be encrypted by different encryption units in parallel to improve throughput.

As described above, the tweaking value manager 501 can calculate two tweaking values corresponding to the two data blocks. For example, to calculate the tweaking values for data blocks of sequence number 0 and 1, the MUX 565 is configured to choose the second input, which can be the tweaking encryption key to the key expansion unit 570. Then the first data encryption unit 502 can receive the initial tweaking value from data input, and use the AES-ECB engine 550 to encrypt the initial tweaking value into an encrypted initial tweaking value T and send to MUX 505 as the first input. The MUX 505 belongs to the tweaking value manager 501, and can operate in the same manner as MUX 320 in FIG. 3. Subsequently, the tweaking value manager 501 can provide two tweaking values T and Tα to the first encryption unit 502 and second encryption unit 503 respectively, more specifically to adder 545 and adder 585 to generate tweaked data blocks and send to the following AES-ECB engines.

In consequence, the first encryption unit 502 can encrypt the data block of the sequence number 0 with the corresponding tweaking value T, and the second encryption unit 503 can encrypt the data block of the sequence number 1 with the corresponding tweaking value Tα. Meanwhile, the MUX 565 can choose the first input, which can be the data encryption key to the key expansion unit 570. The key expansion unit 570 can expand the data encryption key into a set of round keys, and provide the set of round keys to AES-ECB engine 550 and 590 for encryption operation. The AES-ECB engine 550 and 590 can encrypt the tweaked data blocks into encrypted tweaked data blocks, and provide the encrypted tweaked data block to a following buffer, such as buffer 555 and 595.

Subsequently, the buffer 535 and 580 can receive data blocks of sequence number 2 and 3, and transmit them to the adder 545 and 585 respectively. Then the data encryption unit 502 and 503 can operate in pipeline style, that each of the exemplary data encryption unit 502 and 503 can perform operations on two data blocks at the same time. For example, while adder 545 of the first encryption unit 502 is adding $T\alpha^2$ to the data block of sequence number 2, the adder 560 of the same encryption unit is adding T to the encrypted tweaked data block of sequence number 0. While adder 585 of the second encryption unit 503 is adding $T\alpha^3$ to data block of sequence number 3, the adder 596 of the same encryption unit is adding Tα to the encrypted tweaked data block of sequence number 1. The tweaking values T, Tα, $T\alpha^2$, and $T\alpha^3$ can be provided by the tweaking value manager 501 in the manner described with FIG. 3.

The tweaking value manager 501 can continually provide corresponding tweaking values to the data encryption unit 502 and 503 until all the data blocks of the fixed length are encrypted.

The process then proceeds to step S730, where a judgment can be made as to whether the array of data blocks has partial codeword. For example, when the array of data blocks includes 520 bytes, the last data block can include 8 bytes that is shorter than the first 32 data blocks, and is known as partial codeword. If the array of data blocks has partial codeword, the process proceeds to step S740. Otherwise, the process proceeds to step S750.

In step S740, the partial codeword can be encrypted. According to the exemplary AES-XTS module 500, the encrypted previous data block, which is the output of adder 596, can feedback to the MUX 540 via a buffer 541. The buffer 541 can maintain the encrypted previous data block for the partial codeword encryption. A portion of the encrypted previous data block can be combined with the last data block to form a data block of fixed length, then the data block can be encrypted in the same manner as the rest of the data blocks. The process then proceeds to step S750, where the encrypted data blocks can be combined into an array of encrypted data blocks. The process then proceeds to step S760, and terminates.

Figure 6:
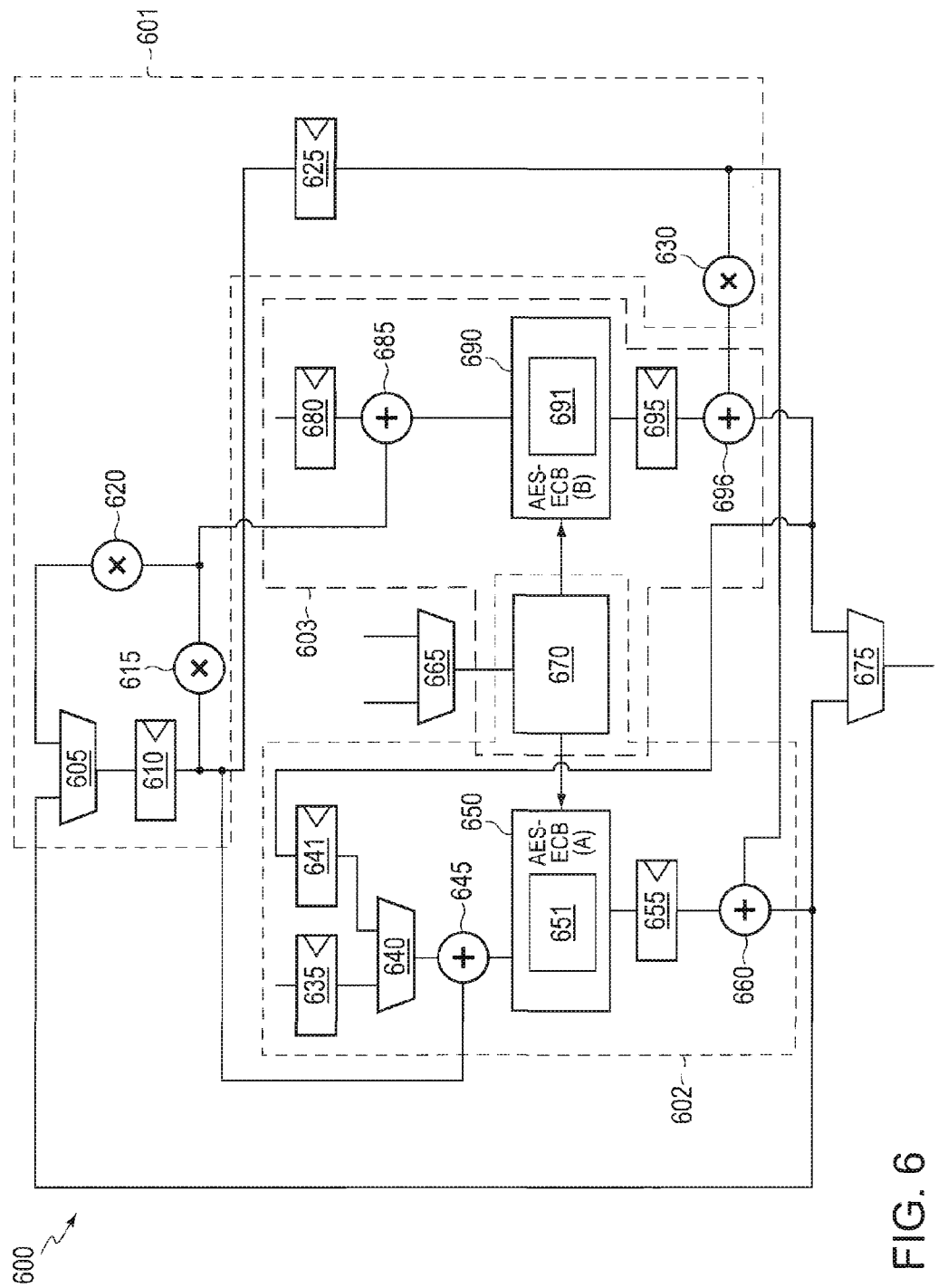
FIG. 6 shows a hardware architecture of an exemplary AES-XTS decryption module.

Similar to the exemplary AES-XTS encryption module 500 in FIG. 5, a more detailed hardware architecture of an exemplary AES-XTS decryption module 600 is shown in FIG. 6. The AES-XTS decryption module 600 can be constructed in a similar manner as the exemplary AES-XTS encryption module 500, except two differences: AES-ECB engine 650 and 690. AES-ECB engine 650 can be a dual purpose engine, which means engine 650 can be configured to perform AES-ECB encryption and can be configured to perform AES-ECB decryption. AES-ECB engine 690 can be a decryption engine. The AES-XTS decryption module 600 can operate in a similar manner as the exemplary AES-XTS encryption module 500, except the dual-purpose engine 650. Initially, the dual-purpose engine 650 can be configured to be AES-ECB encryption engine to encrypt the initial tweaking value. Afterwards, the dual purpose AES-ECB engine can be configured to be decryption engine to perform decryption operations.

Figure 12:
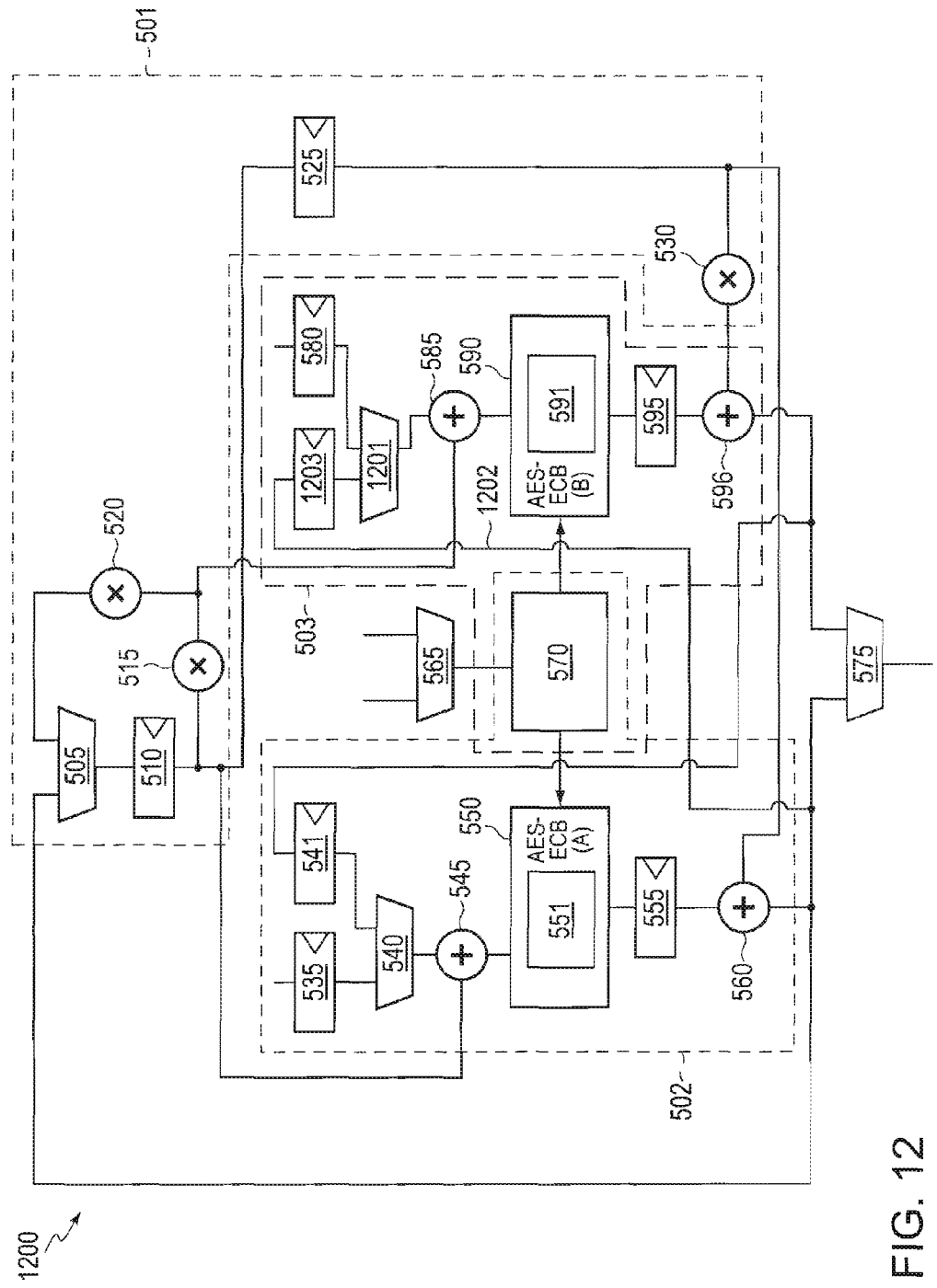
FIG. 12 shows a hardware architecture of an exemplary AES-XTS encryption module.

While the exemplary AES-XTS encryption module 500 includes two data encryption units, it should be understood that more than two data encryption units can be included with supporting features of the tweaking value manager. Further, while the exemplary AES-XTS encryption module 500 includes a data encryption unit configured to handle partial codeword, it should be understood that more than one data encryption unit can be configured to handle partial codeword. For example, FIG. 12 shows another hardware architecture of an exemplary AES-XTS encryption module 1200. The exemplary AES-XTS encryption module 1200 is similar to the exemplary AES-XTS encryption module 500 that includes two data encryption units. While one data encryption units is configured to handle partial codeword in the exemplary AES-XTS encryption module 500, two data encryption units are configured to handle partial codeword in the exemplary AES-XTS encryption module 1200 by adding an additional feedback 1202, a buffer 1203 and a MUX 1201.

While the two data encryption units of the exemplary AES-XTS encryption module 500 are configured to share the data encryption key expansion unit 570, it should be understood that additional data encryption key expansion unit can be added with other corresponding changes, such that each data encryption unit can have its own data encryption key expansion unit. Therefore, the two data encryption units can work asynchronously.

While the exemplary AES-XTS decryption module 600 includes two data decryption units, it should be understood that more than two data decryption units can be included with supporting features of the tweaking value manager. Further, while the exemplary AES-XTS decryption module 600 includes a data decryption unit configured to handle partial codeword, it should be understood that more than one data decryption unit can be configured to handle partial codeword.

While the two data decryption units of the exemplary AES-XTS decryption module 600 are configured to share the data decryption key expansion unit 670, it should be understood that additional data decryption key expansion unit can be added with other corresponding changes, such that each data decryption unit can have its own data decryption key expansion unit. Therefore, the two data decryption units can be configured to work asynchronously.

Furthermore, a context memory can be included in the AES-XTS module to store intermediate data. For example, in one embodiment, an array of data blocks can be received by the AES-XTS module in a first frame and a second frame. The AES-XTS can first perform encryption (or decryption) on the data blocks coming in the first frame. The context memory can store data, such as initial tweaking value, sequence number, tweaking encryption key, and data encryption (or decryption) key. When the data blocks in the second frame are received, the stored data can be used to resume the encryption (or decryption) process of the array of data blocks.

While the invention has been described in conjunction with the specific embodiments thereof, it is evident that many alternatives, modifications, and variations will be apparent to those skilled in the art. Accordingly, the exemplary embodiments of the invention as set forth herein are intended to be illustrative, not limiting. There are changes that may be made without departing from the spirit and scope of the invention.

What is claimed is:

1. An encryption device that encrypts an array of data blocks, the encryption device comprising following components implemented using hardware:
   a tweaking value manager configured to generate an array of tweaking values corresponding to the array of data blocks based on a tweaking encryption key;
   a first encryption unit configured to encrypt a first portion of the array of data blocks into a first portion of encrypted data blocks based on corresponding tweaking values and a data encryption key;
   a second encryption unit configured to encrypt a second portion of the array of data blocks into a second portion of encrypted data blocks based on corresponding tweaking values and the data encryption key, wherein the first encryption unit and the second encryption unit share a key expansion unit configured to expand the data encryption key into a set of round keys, the first encryption unit includes a first and a second tweaking units coupled to input and output respectively of a first AES-ECB engine that is configured to encrypt, according to AES-ECB algorithm, a tweaked data block, based on the set of round keys; and
   a data block combiner configured to combine the first portion of encrypted data blocks and the second portion of encrypted data blocks into an array of encrypted data blocks.

2. The encryption device according to claim 1, wherein the first encryption unit comprises:
   the first tweaking unit configured to calculate a first tweaked data block based on a first data block in the first portion of the array of data blocks and the corresponding tweaking value;
   the first AES-ECB engine configured to encrypt the first tweaked data block into a first encrypted tweaked data block based on the set of round keys; and
   the second tweaking unit configured to calculate a first encrypted data block based on the first encrypted tweaked data block and the corresponding tweaking value; and
   the second encryption unit comprises:
      a third tweaking unit configured to calculate a second tweaked data block based on a second data block in the second portion of the array of data blocks and the corresponding tweaking value;
      a second AES-ECB engine configured to encrypt the second tweaked data block into a second encrypted tweaked data block based on the set of round keys; and
      a fourth tweaking unit configured to calculate a second encrypted data block based on the second encrypted tweaked data block and the corresponding tweaking value.

3. The encryption device according to claim 2, wherein the first encryption unit comprises:
   a first buffer configured to receive the first data block to be encrypted, buffer the first data block for a first pipeline stage of the first encryption unit and provide the first data block to the first tweaking unit; and a second buffer configured to receive the first encrypted tweaked data block, buffer the first encrypted tweaked data block for a second pipeline stage of the first encryption unit and provide the first encrypted tweaked data block to the second tweaking unit; and the second encryption unit comprises:

a third buffer configured to receive the second data block to be encrypted, buffer the second data block for a first pipeline stage of the second encryption unit and provide the second data block to the third tweaking unit; and a fourth buffer configured to receive the second encrypted tweaked data block, buffer the second encrypted tweaked data block for a second pipeline stage of the second encryption unit and provide the second encrypted tweaked data block to the fourth tweaking unit.

4. The encryption device according to claim 1, further comprising:

a round key memory configured to store the set of round keys, and provide the set of round keys to the first and the second encryption units for encrypting each data block.

5. The encryption device according to claim 1, further comprising:

a controller configured to synchronize the key expansion unit with the first and the second encryption units so as to repeatedly expand the data encryption key into the set of round keys and provide the set of round keys to the first and the second encryption units for encrypting each data block.

6. The encryption device according to claim 2, wherein the tweaking value manager further comprises:

a third AES-ECB engine configured to encrypt an initial tweaking value with the tweaking encryption key to generate an encrypted initial tweaking value; and a tweaking value generator configured to calculate the array of tweaking values based on the encrypted initial tweaking value.

7. The encryption device according to claim 6, wherein the third AES-ECB engine is one of the first and second AES-ECB engines.

8. The encryption device according to claim 6, wherein the initial tweaking value is based on a location of a memory that is assigned to store the array of encrypted data blocks.

9. The encryption device according to claim 8, wherein the memory is a sector based memory that is configured to store the array of encrypted data blocks as a data sector.

10. The encryption device according to claim 1, wherein the first portion of the array of data blocks have even sequences, and the second portion of the array of data blocks have odd sequences.

11. The encryption device according to claim 1, further comprising:

a feedback that connects an output of one of the first and second encryption units to an input of one of the first and second encryption units, the feedback being configured to be activated when the data block at the input is a last data block that has shorter length than the rest of the data blocks.

12. A decryption device that decrypts an array of encrypted data blocks, the decryption device comprising following components implemented using hardware:

a tweaking value manager configured to generate an array of tweaking values corresponding to the array of encrypted data blocks based on a tweaking encryption key;

a first decryption unit configured to decrypt a first portion of the array of encrypted data blocks into a first portion of decrypted data blocks based on corresponding tweaking values and a data decryption key;

a second decryption unit configured to decrypt a second portion of the array of encrypted data blocks into a second portion of decrypted data blocks based on corresponding tweaking values and the data decryption key, wherein the first decryption unit and the second decryption unit share a key expansion unit configured to expand the data decryption key into a set of round keys, the first decryption unit includes a first and a second tweaking units coupled to input and output respectively of a first AES-ECB engine that is configured to decrypt, according to AES-ECB algorithm, a tweaked encrypted data block, based on the set of round keys; and a data block combiner configured to combine the first portion of decrypted data blocks and the second portion of decrypted data blocks into an array of decrypted data blocks.

13. The decryption device according to claim 12, wherein the first decryption unit comprises:

the first tweaking unit configured to calculate a first tweaked encrypted data block based on a first encrypted data block in the first portion of the array of encrypted data block and the corresponding tweaking value;

the first AES-ECB engine configured to decrypt the first tweaked encrypted data block into a first tweaked decrypted data block based on the set of round keys; and the second tweaking unit configured to calculate a first decrypted data block based on the first tweaked decrypted data block and the corresponding tweaking value; and the second decryption unit comprises:

a third tweaking unit configured to calculate a second tweaked encrypted data block based on a second encrypted data block in the second portion of the array of encrypted data block and the corresponding tweaking value;

a second AES-ECB engine configured to decrypt the second tweaked encrypted data block into a second tweaked decrypted data block based on the set of round keys; and a second tweaking unit configured to calculate a second decrypted data block based on the second tweaked decrypted data block and the corresponding tweaking value.

14. The decryption device according to claim 13, wherein the first decryption unit comprises:

a first buffer configured to receive the first encrypted data block to be decrypted, buffer the first encrypted data block for a first pipeline stage of the first decryption unit and provide the first encrypted data block to the first tweaking unit; and a second buffer configured to receive the first tweaked decrypted data block, buffer the first tweaked decrypted data block for a second pipeline stage of the first decryption unit and provide the first tweaked decrypted data block to the second tweaking unit; and the second decryption unit comprises:

a third buffer configured to receive the second encrypted data block to be decrypted, buffer the second encrypted data block for a first pipeline stage of the second decryption unit and provide the second encrypted data block to the third tweaking unit; and a fourth buffer configured to receive the second tweaked decrypted data block, buffer the second tweaked decrypted data block for a second pipeline stage of the second decryption unit and provide the second tweaked decrypted data block to the fourth tweaking unit.

15. The decryption device according to claim 12, further comprising:

a round key memory configured to store the set of round keys, and provide the set of round keys to the first and the second decryption units for decrypting each data block.

16. The decryption device according to claim 12, further comprising:

a controller configured to synchronize the key expansion unit with the first and the second decryption units so as to repeatedly expand the data decryption key into the set of round keys and provide the set of round keys to the first and the second decryption units for decrypting each data block.

17. The decryption device according to claim 13, wherein the tweaking value manager further comprises:

a third AES-ECB engine configured to encrypt an initial tweaking value with the tweaking encryption key to generate an encrypted initial tweaking value; and a tweaking value generator configured to calculate the array of tweaking values based on the encrypted initial tweaking value.

18. The decryption device according to claim 17, wherein at least one of the first and second AES-ECB engines is a dual purpose AES-ECB engine that is configurable to perform encryption and decryption, and the tweaking value manager is configured to use the dual purpose AES-ECB engine as the third AES-ECB engine.

19. The decryption device according to claim 17, wherein the initial tweaking value is based on a location of a memory that stores the array of encrypted data blocks.

20. The decryption device according to claim 19, wherein the memory is a sector based memory that is configured to store the array of encrypted data blocks as a data sector.

21. The decryption device according to claim 12, wherein the first portion of the array of encrypted data blocks have even sequences, and the second portion of the array of encrypted data blocks have odd sequences.

22. The decryption device according to claim 12, further comprising:

a feedback that connects an output of one of the first and second decryption units to an input of one of the first and second decryption units, the feedback being configured to be activated when the data block at the input is a last data block that is shorter than the rest of the data blocks.

23. An encryption method that encrypts an array of data blocks and is implemented in hardware, comprising:

generating, by a tweaking value manager, an array of tweaking values corresponding to the array of data blocks based on a tweaking encryption key;

expending, by a key expansion unit, a data encryption key into a set of round keys, wherein a first encryption unit and a second encryption unit share the key expansion unit;

encrypting, by the first encryption unit, according to AES-ECB algorithm, a first portion of the array of data blocks into a first portion of encrypted data blocks based on corresponding tweaking values and the set of round keys;

encrypting, by the second encryption unit, according to AES-ECB algorithm and in parallel with encrypting the first portion of the array, a second portion of the array of data blocks into a second portion of encrypted data blocks based on corresponding tweaking values and the set of round keys; and combining, by a data block combiner, the first portion of encrypted data blocks and the second portion of encrypted data blocks into an array of encrypted data blocks.

24. The encryption method according to claim 23, wherein encrypting the first portion of the array comprises:

calculating a first tweaked data block based on a first data block in the first portion of the array of data blocks and a corresponding tweaking value;

encrypting the first tweaked data block into a first encrypted tweaked data block with the set of round keys according to AES-ECB algorithm; and calculating a first encrypted data block based on the first encrypted tweaked data block and the corresponding tweaking value; and encrypting the second portion of the array comprises:

calculating a second tweaked data block based on a second data block in the second portion of the array of data blocks and a corresponding tweaking value;

encrypting the second tweaked data block into a second encrypted tweaked data block with the set of round keys according to AES-ECB algorithm; and calculating a second encrypted data block based on the second encrypted tweaked data block and the corresponding tweaking value.

25. The encryption method according to claim 24, wherein calculating the first tweaked data block and encrypting the first tweaked data block into the first encrypted tweaked data block are performed in a first pipeline stage, and calculating the first encrypted data block is performed in a second pipeline stage.

26. The encryption method according to claim 23, wherein generating the array of tweaking values further comprises:

encrypting an initial tweaking value into an encrypted initial tweaking value with the tweaking encryption key according to AES-ECB algorithm; and calculating an $n^{th}$ element of the array of tweaking values based on the encrypted initial tweaking value and n.

27. The encryption method according to claim 26, wherein the initial tweaking value is based on a location of a memory that is assigned to store the array of encrypted data blocks.

28. The encryption method according to claim 27, wherein the memory is a sector based memory that is configured to store the array of encrypted data blocks as a data sector.

29. The encryption method according to claim 23, wherein the first portion of the array of data blocks have even sequences, and the second portion of the array of data blocks have odd sequences.

30. A decryption method that decrypts an array of encrypted data blocks and is implemented in hardware, comprising:

generating, by a tweaking value manager, an array of tweaking values corresponding to the array of encrypted data blocks based on a tweaking encryption key;

expanding, by a key expansion unit, a data decryption key into a set of round keys, wherein a first decryption unit and a second decryption unit share the key expansion unit;

decrypting, by the first decryption unit, according to AES-ECB algorithm, a first portion of the array of encrypted data blocks into a first portion of decrypted data blocks based on corresponding tweaking values and the set of round keys;

decrypting, by the second decryption unit, according to AES-ECB algorithm and in parallel with decrypting the first portion of the array, a second portion of the array of data blocks into a second portion of decrypted data blocks based on corresponding tweaking values and the set of round keys; and combining, by a data block combiner, the first portion of decrypted data blocks and the second portion of decrypted data blocks into an array of decrypted data blocks.

31. The decryption method according to claim 30, wherein decrypting the first portion of the array further comprises:

calculating a first tweaked encrypted data block based on a first data block in the first portion of the array of encrypted data blocks and a corresponding tweaking value;

decrypting the first tweaked encrypted data block into a first tweaked decrypted data block with the set of round keys according to AES-ECB algorithm; and calculating a first decrypted data block based on the first tweaked decrypted data block and the corresponding tweaking value; and decrypting the second portion of the array further comprises:

calculating a second tweaked encrypted data block based on a second data block in the second portion of the array of encrypted data blocks and a corresponding tweaking value;

decrypting the second tweaked encrypted data block into a second tweaked decrypted data block with the set of round keys according to AES-ECB algorithm; and calculating a second decrypted data block based on the second tweaked decrypted data block and the corresponding tweaking value.

32. The decryption method according to claim 31, wherein calculating the first tweaked encrypted data block and decrypting the first tweaked encrypted data block into the first tweaked decrypted data block are performed in a first pipeline stage, and calculating the first decrypted data block is performed in a second pipeline stage.

33. The decryption method according to claim 30, wherein generating an array of tweaking values further comprises:

encrypting an initial tweaking value into an encrypted initial tweaking value with the tweaking encryption key; and calculating an $n^{th}$ element of the array of tweaking values based on the encrypted initial tweaking value and n.

34. The decryption method according to claim 33, wherein the initial tweaking value is based on a location of a memory that is assigned to store the array of decrypted data blocks.

35. The decryption method according to claim 34, wherein the memory is a sector based memory that is configured to store the array of decrypted data blocks as a data sector.

36. The decryption method according to claim 30, wherein the first portion of the array of data blocks have even sequences, and the second portion of the array of data blocks have odd sequences.

37. A storage device that stores an array of data blocks, comprising:

a storage medium;

a tweaking value manager configured to generate an array of tweaking values corresponding to the array of data blocks based on a tweaking encryption key and an address of the storage medium;

a first encryption unit configured to encrypt a first portion of the array of data blocks into a first portion of encrypted data blocks based on corresponding tweaking values and a data encryption key;

a second encryption unit configured to encrypt a second portion of the array of data blocks into a second portion of encrypted data blocks based on corresponding tweaking values and the data encryption key, wherein the first encryption unit and the second encryption unit share a key expansion unit configured to expand the data encryption key into a set of round keys, the first encryption unit includes a first and a second tweaking units coupled to input and output respectively of a first AES-ECB engine that is configured to encrypt, according to AES-ECB algorithm, a tweaked data block, based on the set of round keys;

a data block combiner configured to combine the first portion of encrypted data blocks and the second portion of encrypted data blocks into an array of encrypted data blocks, wherein the tweaking value manager, the first encryption unit, the second encryption unit and the data block combiner are implemented in hardware; and a memory controller configured to write the array of encrypted data blocks to the address of the storage medium.

38. The storage device according to 37, further comprising:

a decryption device configured to decrypt the array of encrypted data blocks into the array of data block based on the tweaking encryption key, the address of the storage medium and a data decryption key.

* * * * *